Patented July 30, 1940

2,209,897

UNITED STATES PATENT OFFICE 2,209,897

AQUEOUS SOLUTIONS AND A PROCESS OF PREPARING THEM

Kurt Billig, Frankfort-on-the-Main-Hochst, Germany, assignor to I. G. Farbenindustrie Aktiengesellschaft, Frankfort - on - the - Main, Germany No Drawing. Application August 16, 1938, Serial No. 225,170. In Germany August 31, 1937

12 Claims. (Cl. 260—454)

The present invention relates to aqueous solutions and to a process of preparing them.

I have found that polyvinyl-methyl-ketone and interpolymerization products of vinylmethyl-ketone with other vinyl compounds capable of being polymerized can be caused to react with organic acids or the salts thereof in the presence of water so that the products as such insoluble in water readily dissolve. By the term "organic acids" there are to be understood acids containing carbon. The following acids and salts thereof have been found to be particularly suitable: dichloro-acetic acids, trichloro-acetic acids, chlorocrotonic acids, hydroxybenzoic acids, cinnamic acid, alpha-naphthalene sulfonic acid and beta-naphthalene sulfonic acid, naphthoic acids, benzaldehyde sulfonic acids, thiocyanic acids, halogen-benzene sulfonic acids such as 1, 2-dichlorobenzene-4-sulfonic acid.

As salts there may be used alkali metal salts, such as the sodium, potassium and lithium salts; the ammonium salts; the salts of amines, such as methyl-amine, ethyl-amine, propyl-amine or ethanol-amine, dimethyl-amine, diethyl-amine, or dipropyl-amine, trimethyl-amine, triethyl-amine or tripropyl-amine, cyclohexyl-amine, piperidine, aniline, methyl-aniline, dimethyl-aniline, pyridine, quinoline or quinaldine.

As other vinyl compounds capable of being polymerized there may be used acrylic acid, acrylic acid methyl ester and acrylic acid ethyl ester, acrylic acid nitrile, vinyl-methylether, vinyl-isobutylether, styrene, vinyl-acetate, vinyl-proprionate, vinylbutyrate or vinylchloride. It is, however, suitable to use these compounds in a quantity of at most about 10 per cent. of the quantity of the vinylmethyl-ketone.

The new process is carried out as follows: Polyvinyl-methyl-ketone or the interpolymerization products of vinylmethyl-ketone are stirred or kneaded with the aqueous solutions of the acids or the salts thereof. The use of the aqueous emulsions or suspensions of the polymerization products have been found to be especially suitable. It is often advantageous to apply the acids not in the free state, but in the form of their salts which in most cases are more suitable to act in a dissolving manner, especially when concentrated solutions are used.

There is suitably operated at room-temperature. The quantities required of water and acid or salt greatly vary in each case. They can, however, always be determined without difficulty. The reaction is continued until the polymerization product has completely dissolved. The polymerizates are reprecipitated from the solutions by heating or by strongly diluting them with water. It is, therefore, possible to use the solutions for the preparation of threads, films and other shaped articles.

The following examples serve to illustrate the invention, but they are not intended to limit it thereto, the parts being by weight:

(1) 10 parts of solid polyvinyl-methyl-ketone are stirred at room temperature with 100 parts of potassium thiocyanate solution of 10 per cent. strength. Dissolution occurs after 10–30 hours. If the polyvinylmethyl-ketone is used in the finely distributed condition, for instance in the form of an emulsion or a suspension, dissolution occurs within a few moments. On heating separations take place which, on cooling, dissolve again.

(2) A solution of 10 parts of trichloro-acetic acid in 10 parts of water is neutralized, while cooling, with concentrated ammonia, 40–50 parts of an aqueous emulsion of 24 per cent. strength of polyvinyl-methyl-ketone are dissolved at 20° C. within a few minutes in said solution. A thick, clear liquid is obtained.

(3) A solution of ethanol amine cinnamate is prepared by combinating 7.4 parts of cinnamic acid and 3.1 parts of ethanol-amine in 25 parts of water. By the addition of 40 parts of an aqueous emulsion of 24 per cent. strength of polyvinyl-methyl-ketone a clear solution is rapidly obtained.

(4) 5 parts of an emulsion of 16 per cent. strength of polyvinyl-methyl-ketone are kneaded with 3 parts of beta-naphthalene sulfonic acid; a clear solution is formed. The salts of beta-naphthalene sulfonic acid dissolve much more readily and in larger quantities than beta-naphthalene-sulfonic acid itself.

(5) 1 part of 1,2,4-trichloro-benzene-5-sulfonic acid are stirred into 3 parts of an aqueous emulsion of 18 per cent. strength of an interpolymerization product of vinyl-methyl-ketone and vinyl-isobutyl-ether in a proportion of 3 mol:1 mol. A clear, strongly foaming solution is rapidly formed.

Instead of the interpolymerization product named numerous other interpolymerization products may be used, for instance those of vinyl-methyl-ketone with changing quantities of vinyl-ether, or esters of unsaturated acids, or the free unsaturated acids or unsaturated nitriles.

I claim:

1. The process which comprises causing a compound of the group consisting of polyvinylmethyl-ketone and interpolymerization products of vinylmethyl-ketone with other vinyl compounds to act upon a compound of the group consisting of organic acids and salts thereof in the presence of water until the polymerization product has completely dissolved.

2. The process which comprises causing a compound of the group consisting of polyvinyl-methyl-ketone and interpolymerization products of vinylmethyl-ketone with other vinyl compounds to act upon aqueous solution of a compound of the group consisting of organic acids and salts thereof with alkali metals, ammonia and amines until the polymerization product has completely dissolved.

3. The process which comprises causing an aqueous emulsion of a compound of the group consisting of polyvinyl-methyl-ketone and interpolymerization products of vinylmethyl-ketone with other vinyl compounds to act at room temperature upon an aqueous solution of a compound of the group consisting of oganic acids and salts thereof with alkali metals, ammonia and amines until the polymerization product has completely dissolved.

4. The process which comprises causing polyvinyl-methyl-ketone to act at room temperature upon an aqueous solution of potassium thiocyanate until the polyvinyl-methyl-ketone has completely dissolved.

5. The process which comprises causing an aqueous emulsion of polyvinyl-methyl-ketone to act at room temperature upon beta-naphthalene-sulfonic acid until the polyvinyl-methyl-ketone has completely dissolved.

6. The process which comprises causing an aqueous emulsion of an interpolymerization product of vinylmethyl-ketone and vinylisobutyl ether to act at room temperature upon 1,2,4-trichloro-benzene-5-sulfonic acid until the interpolymerization product has completely dissolved.

7. Aqueous solutions which are substantially identical with the solutions obtained by the process defined in claim 1.

8. Aqueous solutions which are substantially identical with the solutions obtained by the process defined in claim 2.

9. Aqueous solutions which are substantially identical with the solutions obtained by the process defined in claim 3.

10. Aqueous solutions which are substantially identical with the solutions obtained by the process defined in claim 4.

11. Aqueous solutions which are substantially identical with the solutions obtained by the process defined in claim 5.

12. Aqueous solutions which are substantially identical with the solutions obtained by the process defined in claim 6.

KURT BILLIG.